United States Patent [19]

Hyll

[11] Patent Number: 5,427,500

[45] Date of Patent: Jun. 27, 1995

[54] SLURRY PUMP SEAL SYSTEM

[75] Inventor: John Hyll, Sandy, Utah

[73] Assignee: The Weir Group plc

[21] Appl. No.: 212,963

[22] Filed: Mar. 15, 1994

[51] Int. Cl.⁶ .......................... F04D 29/08; F04D 7/04
[52] U.S. Cl. ..................... 415/118; 415/111; 277/3
[58] Field of Search .............. 415/13, 20, 111, 118, 415/169.1; 277/1, 3, 59

[56] References Cited

U.S. PATENT DOCUMENTS

| | | | |
|---|---|---|---|
| 2,448,717 | 9/1948 | Jeffcock | 415/111 |
| 2,800,084 | 7/1957 | Butler | 415/118 |
| 3,137,237 | 8/1961 | Zagar et al. | |
| 3,402,671 | 5/1967 | Wilfley et al. | |
| 3,515,497 | 8/1968 | Studebaker et al. | |
| 3,620,642 | 11/1971 | Studebaker et al. | |
| 3,652,180 | 3/1972 | Choquette et al. | |
| 3,656,861 | 4/1972 | Zagar | |
| 3,704,960 | 12/1972 | Zagar | |
| 4,915,579 | 4/1990 | Whittier et al. | |
| 4,997,340 | 3/1991 | Zinsmeyer et al. | 415/111 |
| 5,195,867 | 3/1993 | Stirling | 415/111 |
| 5,308,229 | 5/1994 | DuPuis et al. | 417/368 |
| 5,346,361 | 9/1994 | Jurgill et al. | 415/111 |

Primary Examiner—Edward K. Look
Assistant Examiner—Michael S. Lee
Attorney, Agent, or Firm—Vinson and Elkins

[57] ABSTRACT

A centrifugal pump assembly comprises a pump housing defining a pump cavity, a drive shaft rotatably mounted to the housing, an impeller rotatably disposed in the housing and operatively coupled to the drive shaft, and a shaft seal disposed between the shaft and the housing. At least one sensor is operatively connected to the housing for detecting whether a slurry in the housing has migrated radially inwardly a predetermined extent. Pressurizing componentry is operatively connected to the housing for injecting pressurized air into the housing at a point between the shaft seal and a rotating slurry ring in the housing upon detection by the sensor that a slurry-air interface has moved radially inwardly beyond the location of the sensor. The sensor and the pressurizing componentry thus generate and maintain a gaseous buffer zone between the slurry and the shaft seal during operation of the pump assembly.

15 Claims, 1 Drawing Sheet

SLURRY PUMP SEAL SYSTEM

BACKGROUND OF THE INVENTION

This invention relates to a centrifugal pump. More particularly, this invention relates to a method and structure for forming a controlled air buffer cavity under pressure between a drive shaft seal and a rotating ring of slurry inside the pump housing.

A number of techniques are known for sealing slurry pumps. Mechanical seals are generally very expensive and are limited in their applications to light slurries. Dry gland expellers, as used in ASH pump R SRCTM pumps, are cheaper than mechanical seals and may be used in heavy slurry applications. However, dry gland expellers have limitations on sealing pressure. Moreover, dry gland expellers consume power and increase impeller overhang and shaft deflection.

Summary of the Invention

A centrifugal pump assembly comprises, in accordance with the present invention, a pump housing defining a pump cavity, a drive shaft rotatably mounted to the housing, an impeller rotatably disposed in the housing and operatively coupled to the drive shaft, and a shaft seal disposed between the shaft and the housing. Componentry is operatively connected to the housing for generating and maintaining a gaseous buffer zone between a pumped fluidic material (e.g., slurry) in the housing and the shaft seal during operation of the pump assembly.

According to another feature of the present invention, the gas buffer generating componentry includes a pressurizing device operatively connected to the housing for injecting a gas under pressure into the housing at a point between the shaft seal and a ring of the fluidic material in the housing.

According to a further feature of the present invention, the gas buffer generating componentry further includes at least one sensor operatively connected to the pressurizing device for monitoring or sensing the fluidic material in the housing during operation of the pump assembly and for activating the pressurizing device to inject gas into the housing upon detecting approach of the fluidic material towards the shaft seal. More specifically, the sensor is linked to the housing for detecting an advance of the fluidic material in a radially inward direction to a point less than a predetermined distance from the shaft.

According to an additional feature of the present invention, the gas buffer generating componentry includes a pressurized gas source and a valve connected to the gas source, the sensor being operatively connected to the valve for operating the valve in response to detecting a radially inward advance of the fluidic material to within the predetermined distance from the shaft.

Wherein the housing includes a rubber liner along the cavity, the sensor is mounted to the housing on a side of the liner opposite the cavity.

It is contemplated that the shaft seal is an air compressor type seal. A second seal in the form of a centrifugal lift seal may be disposed between the shaft seal and the cavity. The gas buffer generating componentry then communicates with the pump cavity via a bore in the housing between the shaft seal and the centrifugal lift seal.

The present invention is also directed to a method for operating a centrifugal pump assembly. As discussed above, such a pump assembly includes an impeller rotatably disposed in a pump cavity defined by a housing. The impeller is drivingly connected to a drive shaft, with a shaft seal being disposed between the shaft and the housing. The method comprises the steps of (a) rotating the impeller to form a rotating ring of a fluidic material in the cavity, and (b) upon an approach of the fluidic material towards the shaft seal, injecting gas into the housing at a point between the shaft seal and the fluidic material to generate and maintain a gaseous buffer zone between the fluidic material in the housing and the shaft seal during rotation of the impeller.

It is contemplated that the method further comprises the step of sensing the fluidic material in the housing during rotation of the impeller. In that case, the injection of the gas into the housing is executed upon detecting approach of the fluidic material towards the shaft seal.

Pursuant to another feature of the present invention, the step of sensing includes the step of detecting an advance of the fluidic material in a radially inward direction to a point less than a predetermined distance from the shaft. This step is implemented by operating a sensor appropriately positioned along a housing wall facing the impeller.

A sensor in accordance with the present invention may be of the microwave type. In that event, it is advisable to position the sensor in a wall of the housing so that only a rubber liner or other non-metallic liner material separates the sensor from the pump cavity. This structural feature obviates interference of metallic housing material with the operation of the sensor.

Pursuant to a supplemental feature of the present invention, the injection of the gas (e.g., air) is accomplished by opening a valve to connect a pressurized source of the gas to the pump cavity upon detecting a radially inward advance of the fluidic material to within the predetermined distance from the shaft.

Thus, the basic idea of the present invention is to provide a controlled air pressure cavity or buffer zone behind the impeller between the slurry and a downstream shaft seal. Control is provided via a microwave slurry sensor which monitors the position of the slurry to determine whether the slurry has advanced radially to the location of the sensor. When slurry is sensed, a signal is generated which may be transmitted wirelessly to a remote controller. In response to receiving the signal from the sensor, the remote controller opens a solenoid type valve to introduce air from a pressurized source or supply into the pump cavity upstream of the shaft seal.

While the pump is running, centrifugal force on the slurry allows the air to act against the rotating slurry ring, without penetration, after passing the centrifugal lift seal. As air continues to flow into the cavity, the slurry-air interface moves radially outwardly until the interface passes the sensor. At that juncture, the sensor no longer detects the slurry and consequently signals the remote controller to close the solenoid valve. The system is now in a steady state with an air buffer between the slurry and the shaft air seal. Because of centrifugal forces, the centrifugal lift seal lip is not making contact.

During operation, some air will leak past the shaft seal and escape into the atmosphere. Consequently, the slurry-air interface will gradually move radially inwardly. The moving interface is detected upon passing the sensor and thus initates another air injection or pressurization cycle.

Prior to start-up, slurry fills the cavity behind the impeller up to the centrifugal lift seal. Upon pump start-up, impeller rotation centrifuges the slurry with or without the aid of a vortex generator. At the same instant, the air solenoid valve is opened to permit air to enter the pump housing and flow past the lift seal to push the slurry radialy outwardly. As the slurry passes the sensor, the air solenoid valve is closed. At this instant, the system is in steady state operation until an upset occurs due to a change in pressure.

At the termination of pump operation and during speed coast-down, the centrifugal lift seal will contact its cooperating sealing surface and prevent slurry from contacting the downstream shaft seal.

A pump sealing system in accordance with the present invention eliminates the disadvantages of mechanical seals, as well as of dry gland expellers.

Detailed Description

Figure 1:
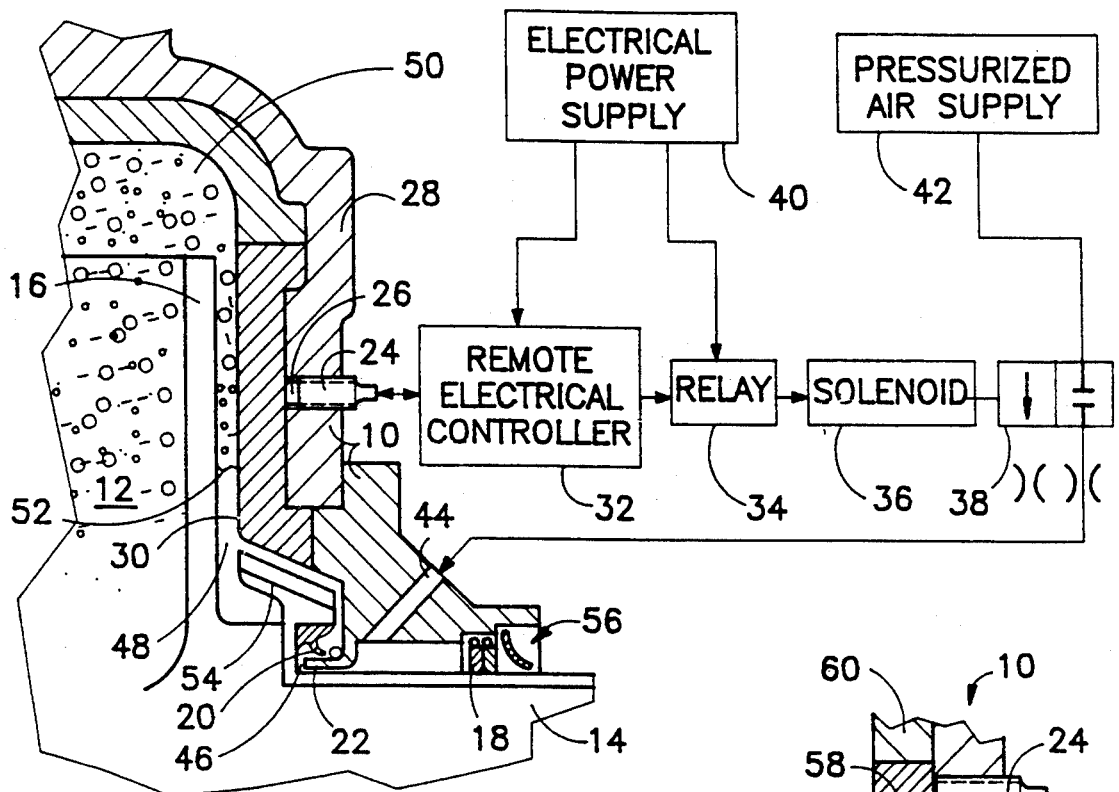
FIG. 1 is partially a block diagram and partially a schematic partial cross-sectional view of a centrifugal pump with a sealing system in accordance with the present invention.
Figure 2:
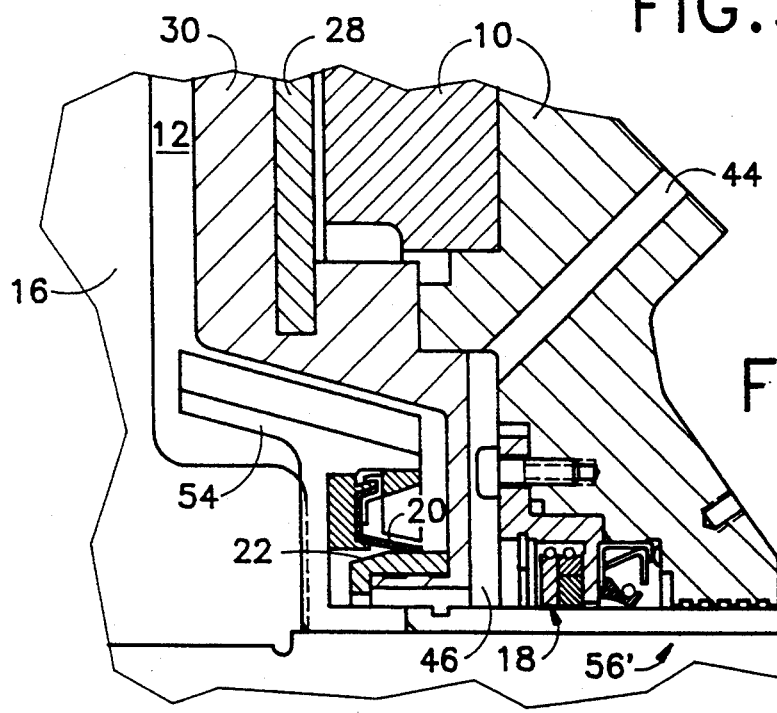
FIG. 2 is a cross-sectional view, on a larger scale, showing details of the pump of FIG. 1.

As illustrated in FIGS. 1 and 2, a centrifugal pump assembly comprises a pump housing 10 defining a pump cavity 12. A drive shaft 14 is rotatably mounted to housing 10 and is connected to an impeller 16 also rotatably disposed in housing 10 and particularly in pump cavity 12. A shaft seal 18 is disposed between shaft 14 and housing 10. A second seal 20, in the form of a centrifugal lift seal, is also provided in housing 10. In FIG. 2, lift seal 20 is shown engaging a contact surface 22 of housing 10. During steady state operation, when impeller 16 is rotating at high speed, centrifugal force causes lift seal 20 to break contact with surface 22, as illustrated in FIG. 1.

As further illustrated in FIG. 1, a microwave sensor or level and interface detector 24 of a type sold by TN Technologies, Inc. of Round Rock, Texas, U.S.A. under the trademark CANNON BEAR, is mounted to housing 10. More particularly, sensor 24 is disposed inside a bore 26 formed in a metallic shell or wall 28. Sensor 24 is juxtaposed to a rubber liner 30 in part defining pump cavity 12.

Sensor 24 includes a transmitter, not separately illustrated, for wirelessly communicating with a remote electrical controller 32. Controller 32 is connected to a relay 34 which in turn is operatively coupled to a solenoid element 36 of a valve 38. Controller 32 and relay 34 are energized with electrical power from a voltage or current supply 40.

A supply or source 42 of pressurized air is connectable via valve 38 to a bore 44 in housing 10. Bore 44 is located at a point between shaft seal 18 and centrifugal lift seal 20. Bore 44 communicates with pump cavity 12 during steady state operation of the pump assembly via a passageway 46 which is closed by lift seal 20 when the pump is not operational.

During operation of the pump assembly, sensor 24, remote controller 32, relay 34, solenoid 36, valve 38, and pressurized supply 42 together perform the function of generating and maintaining, in housing cavity 12, a gaseous buffer zone 48 between a rotating ring of pumped fluidic material (e.g., a slurry) 50 in housing 10 and shaft seal 18. Buffer zone 48 and slurry 50 define a slurry-air interface 52 during a steady state operation of the pump assembly, as shown in FIG. 1.

In operating the centrifugal pump assembly of FIGS. 1 and 2, impeller 16 is rotated by shaft 14 to form a rotating ring of slurry 50 in cavity 12 (FIG. 1). When the slurry 50 begins to approach seals 18 and 20, i.e., when slurry-air interface 52 moves radially inwardly past sensor 24 (see FIG. 1), to a point within a pre-established distance from shaft 14, sensor 24 transmits a signal to remote controller 32. Remote controller 32 then causes relay 34 to energize solenoid 36, thereby shifting valve 38 from the closed position indicated in FIG. 1 to an opened position. In its opened position, valve 38 permits an injection of air from supply 42 through bore 44 and centrifugal lift seal 20 into pump cavity 12. The consequent increase in pressurization of buffer zone 48 forces the rotating ring of slurry at 52 to move radially outwardly past sensor 24 and consequently past the pre-established distance from shaft 14 defined by the location of sensor 24 in housing wall 28.

Sensor 24 thus monitors or senses the fluidic slurry material 50 in housing 10 during operation of the pump assembly and activates pressurizing valve 38 to inject air or gas into housing 10 upon detecting approach of the fluidic material towards seal 18.

It is to be noted that sensor 24 is mounted to housing 10 on a side of rubber liner 30 opposite pump cavity 12. The omission of metal between sensor 24 and cavity 12 is required to facilitate or enable detection of the slurry by the microwave sensor 24.

Sensor 24 and the pressurization components responsive thereto serve to generate and maintain air pressure cavity or buffer zone 48 behind impeller 16 between slurry 50 and a shaft seal 18. While the pump is running, centrifugal force on the slurry allows the air to act against the rotating slurry ring after passing centrifugal lift seal 20. As air continues to flow into cavity 12, slurry-air interface 52 moves radially outwardly until the interface passes sensor 24. Then, sensor 24 no longer detects slurry 50 and consequently signals remote controller 32 to close the solenoid valve 38.

During steady state operation of the pump assembly, some air will leak past shaft seal 18 and escape into the atmosphere. Consequently, the slurry-air interface will gradually move radially inwardly. The moving interface is detected upon passing the sensor and thus initates another air injection or pressurization cycle.

Prior to start-up, slurry 50 fills cavity 12 behind impeller 16 up to centrifugal lift seal 20. Upon pump start-up, rotation of impeller 16 centrifuges the slurry with or without the aid of a vortex generator 54. In addition, valve 38 is opened to permit air to enter pump housing 10 and flow past lift seal 20 to push slurry 50 radially outwardly. As the slurry passes sensor 24, valve 38 is closed.

At the termination of pump operation and during speed coast-down, centrifugal lift seal 20 will contact its cooperating sealing surface 22 and prevent slurry 50 from contacting the downstream compression type shaft seal 18.

FIGS. 1 and 2 also show an ancillary seal 56 or 56' for preventing dirt particles from entering the pump.

Figure 3:
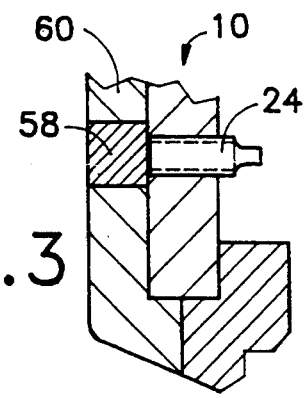
FIG. 3 is a partial cross-sectional view, showing a modification of the pump and sealing system of FIG. 1.

As illustrated in FIG. 3, liner 30 may be replaced with a plug of rubber 58 disposed in a metal liner 60 of pump housing 10.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A centrifugal pump assembly comprising:
   a pump housing defining a pump cavity;
   a drive shaft rotatably mounted to said housing;
   an impeller rotatably disposed in said housing and operatively coupled to said drive shaft;
   a shaft seal disposed between said shaft and said housing; and
   gas buffer generating means operatively connected to said housing for generating and maintaining a gaseous buffer zone between a pumped fluidic material in said housing and said shaft seal during operation of the pump assembly.

2. The assembly defined in claim 1 wherein said gas buffer generating means includes pressurizing means operatively connected to said housing for injecting a gas under pressure into said housing at a point between said shaft seal and a rotating ring of said fluidic material in said housing.

3. The assembly defined in claim 2 wherein said gas buffer generating means further includes at least one sensing means operatively connected to said pressurizing means for sensing said fluidic material in said housing during operation of the pump assembly and activating said pressurizing means to inject gas into said housing upon detecting approach of said fluidic material towards said shaft seal.

4. The assembly defined in claim 3 wherein said sensing means is linked to said housing for detecting an advance of said fluidic material in a radially inward direction to a point less than a predetermined distance from said shaft.

5. The assembly defined in claim 4 wherein said gas buffer generating means includes a pressurized gas source and a valve connected to said gas source, said sensing means being operatively connected to said valve for operating same in response to detecting a radially inward advance of said fluidic material to within said predetermined distance from said shaft.

6. The assembly defined in claim 4 wherein said housing includes a rubber liner along said cavity, said sensing means including at least one sensor mounted to said housing on a side of said liner opposite said cavity.

7. The assembly defined in claim 1 wherein said shaft seal is an air compressor type seal.

8. The assembly defined in claim 5, further comprising a centrifugal lift seal disposed between said shaft seal and said cavity, said gas buffer generating means communicating with said cavity via a bore in said housing between said shaft seal and said centrifugal lift seal.

9. The assembly defined in claim 1 wherein said gas buffer generating means includes a pressurized gas source, a valve connected to said gas source, and means operatively connected to said valve for opening said valve at intervals to maintain gaseous pressure in said buffer zone.

10. The assembly defined in claim 1 wherein said shaft seal is a downstream seal.

11. A method for operating a centrifugal pump assembly including an impeller rotatably disposed in a pump cavity defined by a housing, said impeller being drivingly connected to a drive shaft, a shaft seal being disposed between said shaft and said housing, the method comprising the steps of:
    rotating said impeller to form a rotating ring of a fluidic material in said cavity; and
    upon an approach of said fluidic material towards said shaft seal, injecting gas into said housing at a point between said shaft seal and said fluidic material to generate and maintain a gaseous buffer zone between said fluidic material in said housing and said shaft seal during rotation of said impeller.

12. The method defined in claim 11, further comprising the step of sensing said fluidic material in said housing during rotation of said impeller, said step of injecting gas into said housing being executed upon detecting approach of said fluidic material towards said shaft seal.

13. The method defined in claim 12 wherein said step of sensing includes the step of detecting an advance of said fluidic material in a radially inward direction to a point less than a predetermined distance from said shaft.

14. The method defined in claim 13 wherein said step of injecting includes the step of opening a valve to connect a pressurized source of said gas to said cavity upon detecting a radially inward advance of said fluidic material to within said predetermined distance from said shaft.

15. The method defined in claim 11 wherein said shaft seal is an air compressor type seal and said pump assembly further includes a centrifugal lift seal disposed between said shaft seal and said cavity, said step of injecting including the step of introducing said gas into said housing between said shaft seal and said centrifugal lift seal.

* * * * *